United States Patent [19]

Sugino et al.

[11] Patent Number: 4,652,455

[45] Date of Patent: Mar. 24, 1987

[54] SIMULATED LOBSTER MEAT AND PROCESS FOR PREPARING SAME

[75] Inventors: Yoshito Sugino, Nanao; Iwao Yamamoto, Tsuruga, both of Japan

[73] Assignee: Sugiyo Co., Ltd., Nanao, Japan

[21] Appl. No.: 724,909

[22] Filed: Apr. 19, 1985

[30] Foreign Application Priority Data

Apr. 19, 1984 [JP] Japan ................................. 59-079886

[51] Int. Cl.$^4$ .......................... A23L 1/325; A23B 4/08
[52] U.S. Cl. .................................... 426/104; 426/250; 426/575; 426/643; 426/512
[58] Field of Search ............... 426/643, 641, 574, 575, 426/104, 250, 512, 513, 276

[56] References Cited

U.S. PATENT DOCUMENTS

| | | | |
|---|---|---|---|
| 3,846,566 | 11/1974 | Blomstrom | 426/250 |
| 3,863,017 | 1/1975 | Yueh | 426/513 |
| 4,158,065 | 6/1979 | Sugino | 426/574 |
| 4,362,752 | 12/1982 | Sugino et al. | 426/643 |
| 4,427,704 | 1/1984 | Cheney et al. | 426/574 |

*Primary Examiner*—Raymond N. Jones
*Assistant Examiner*—Carolyn Paden
*Attorney, Agent, or Firm*—Fidelman, Wolffe & Waldron

[57] ABSTRACT

A product of fish meat paste simulating the meat of the lobster containing a heat-coagulated mixture of one part by weight of fish meat paste and 0.2 to 2 parts by weight of mannan gel modified by freezing. The fish meat paste is made of "surimi" and at least one additive selected from salt, seasoning agents, starch and texturing agents. The modified mannan gel is in the form of flakes less than 3 mm thick to impart to the coagulated mixture a texture which gives a particular oral sensation as if real lobster meat were being eaten.

11 Claims, No Drawings

SIMULATED LOBSTER MEAT AND PROCESS FOR PREPARING SAME

BACKGROUND OF THE INVENTION

This invention relates to a product of fish meat paste simulating the meat of macrura in both taste and texture. More particularly, this invention relates to a product of fish meat paste which give a particular oral sensation or resistance to mastication as if the meat of relatively large-sized species of macrura such as lobsters and spring lobsters were eaten.

Many people like the meat of macrura since it contains little fat and has not only a light flavor but also a superior texture which gives a particular oral sensation or a kind of crispness combined with elasticity when the meat is bitten. In recent years, however, the supply cannot meet the demand, and lobsters have become a rather expensive seafood.

In the fish meat paste product industry various attempts have been made to develop substitutes for the meat of natural macrura. The known substitues, however, comprise nothing more than fish meat paste mixed with the meat of natural macrura or seasoned with an essence extracted from natural macrura so that they have merely a taste of flavor similar to that of natural macrura meat and cannot satisfy the consumers with respect to the oral sensation experienced upon eating them.

U.S. Pat. No. 4,362,752 discloses a product of simulated shrimp meat which not only has a taste and flavor similar to that of real shrimp meat but also a particular oral sensation or a kind of crispness combined with elasticity as to satisfy consumers. However, the patent is directed to a product of fish meat paste simulating chiefly small-sized shrimp.

In the field of marine product industry studies and experiments are believed to be being conducted, but to the best knowledge of the present inventors, except the above-mentioned patent there have been no technical reports or literature on the method of giving to the product of fish meat paste not only taste and flavor similar to those of actual lobster meat but also the particular oral sensation experienced upon eating natural lobster meat.

The reason why there have been very few proposals to meet the demand for products of fish meat paste having taste and texture similar to those of real lobster meat is believed to be because lobster meat comprises a plurality of muscle fibers closely intertwined so that it is extremely difficult to make such closely intertwined muscle fibers from any other food material than actual lobster meat.

As a result of various studies and experiments conducted since the accomplishment of the invention disclosed in the above-mentioned U.S. patent, the present inventors have found out that by freezing mannan gel to denature or modify the saccharide and adding the denatured or modified mannan gel to fish meat paste in a predetermined ratio, mixing the gel and paste and coagulating the mixture by heating, it is possible to obtain a product of fish meat paste approximating lobster meat.

SUMMARY OF THE INVENTION

The product of fish meat paste prepared in accordance with the invention comprises a coagulated mass of fish meat paste prepared by mixing (a) 1 (one) part by weight of fish meat paste prepared by mixing fish meat "surimi" with one or more of salt and other seasonings, starch and a texturing agent, and (b) 0.2 to 2 parts by weight of flakes of mannan gel denatured or modified by freezing, the flakes having thickness of less than 3 mm.

DESCRIPTION OF THE PREFERRED EMBODIMENTS

In the specification and claims, the terms "denatured" or "modified" and "denaturation" or "modification" mean that the mannan gel, once frozen and defrosted, has become less hydrophilic.

The "surimi", a Japanese word, means the fish meat paste which is obtained in the following manner: The guts are removed from a fish, which is then crushed or squeezed so that somewhat mashed flesh or meat is separated from the skin, head, bones, and other components of the fish. The separated mass of meat is then rinsed in water so that water-soluble proteins are removed from the meat. The fish meat thus obtained is "surimi".

In accordance with the invention the modified mannan gel is made in the following manner: Powder of water-soluble mannan such as galactomannan is dissolved in water at about 40° C. The amount of the mannan powder to be added is 0.5% to 20% of water. If the amount is less than 0.5%, the frozen gel releases too much water when it is defrosted, so that the yield decreases as compared with the amount of material that has been treated. On the contrary, if the amount of mannan powder in the water solution exceeds 20%, the viscosity of the solution becomes too high to enable effective kneading of the materials, with resulting lowering of the productivity. The mannan content of 2.5% to 12% is suitable and therefore is preferred.

A suitable amount of starch may be added to the water solution of mannan. The amount of starch to be added is 50% to 250% of the weight of mannan.

The addition of starch is advantageous and economical in that it helps not only improve the ability of the mannan gel to retain water-soluble seasonings such as monosodium glutamate or extracted seasonings but also properly control releasing of water from the gel thereby to increase the yield.

With too much starch added, however, the modified mannan gel will not have a proper strength so that the final product may not have a texture to give a particular oral sensation similar to that of natural lobster, and sometimes even the taste of the product will be seriously impaired.

To cause the water solution of mannan to gel, a water suspension or solution of calcium hydroxide, sodium carbonate, or any other suitable compound is added as a gelation accelerator to the water solution of mannan, which is stirred well and then held stationary for gelation. When calcium hydroxide is used, for example, a water solution of mannan is prepared, to which a water solution of calcium hydroxide is added, and by adjusting the pH of the mixture to about 10.5 it is possible to produce mannan gel with the highest efficiency.

The mannan gel obtained in the above manner is then frozen for denaturation or modification. If the gel is shaped by cutting into a plate-like mass having a thickness of 1.5 cm to 3 cm, it is possible to shorten the time required for modification by freezing.

For freezing the mannan gel may be cut and shaped into a plate-like mass having a thickness of 1.5 cm to 3 cm. Alternatively, the above-mentioned solution of mannan may be put into a shallow cylindrical mold or applied onto a metal plate for gelation.

The above plate-like mass of mannan gel is placed in a freezer and kept therein at $-20°$ C. to $-30°$ C. for about 3 to 16 hours, whereupon the gel is frozen and modified. Alternatively, the plate-like mass shaped by cutting, or the gel in the mold or on the plate may be passed through a tunnel, in which liquid nitrogen is sprayed onto the gel for 2 to 5 minutes so as to rapidly freeze the surface of the gel. After the preliminary freezing the gel is put in a freezer and kept at $-20°$ C. to $-30°$ C. for 30 minutes to 12 hours, whereupon the mannan gel becomes frozen and modified.

The frozen gel obtained in the above manner is then formed into a film or tape having a width of 1.5 cm to 3 cm and a thickness of less than 3 mm, preferably, 0.5 mm to 3 mm.

The method of applying the water solution of mannan onto a metal plate for gelation and subsequent freezing of the applied layer of the solution is advantageous in that the frozen gel obtained has a thickness suitable for a film or tape of mannan gel.

The disk-like mass of mannan gel obtained by using the above-mentioned circular mold has the advantage that a film or tape of mannan gel can be continuously cut from the mannan disk by applying a cutting blade to the periphery of the mannan disk and gradually moving the blade toward the center thereof as the circular mold is rotated about its axis.

To obtain a product simulating lobster meat, the tape of modified mannan gel which is 1 mm to 3 mm thick and 1.5 cm to 3 cm wide is cut into flakes of 2 cm to 5 cm in length.

To obtain a product simulating the meat of spring lobsters which is a little softer or has a little smaller resistance to mastication, the flakes of modified mannan gel preferably have a thickness on the order of 0.5 mm to 1.5 mm.

The flakes of frozen mannan gel are placed in a stream of water to defrost them and at the same time cause the gelation accelerator remaining therein to be eluted therefrom thereby to remove the smell of calcium, and then put into a centrifuge for dehydration.

Each of the flakes of modified mannan gel processed in the above-mentioned manner comprises a flexible translucent white piece having filmy portions intertwined with reticulate portions.

As a production test 1 kg of water solution containing 3% of mannan was processed in the above-mentioned manner, and flakes of modified mannan gel weighing 200 g after dehydration were obtained.

Three lots of 1 kg of water solution containing 3% of mannan and 3%, 5% and 7% of corn starch, respectively, were treated in the above-mentioned manner to obtain 420 g, 560 g, and 700 g of flakes of modified mannan gel, respectively. These products are slightly different from each other in flexibility and resistance to mastication depending upon the amount of starch added.

To obtain fish meat paste, any known method of producing "kamaboko" may be employed. The "kamaboko" is a traditional Japanese food which is a kind of molded fish meat paste. For example, 1 kg of "surimi" of high-grade fish meat is mixed with 0.3 kg of ice water and 25 g of common salt. The mixture is well kneaded while adding 10 g of a seasoning, 60 g of starch and 1 (one) g of a texturing agent to obtain a mass of fish meat paste. In order to regulAte the flexibility of the final product, the kind of fish from which "surimi" is obtained and/or the amount of "surimi" may be changed. On the other hand, to adjust the jelly strength of the mannan gel any method known in the art such as changing the amount of starch to be added may be employed.

The mixing ratio of the fish meat paste and the flakes of modified mannan gel is a critical factor for determining the oral sensation which the final product will give, that is, the oral sensation similar to that experienced when real lobster meat is eaten.

The mixing ratio is 1 (one) part by weight of the fish meat paste and 0.3 to 2 parts by weight of the flakes of modified mannan gel. The materials are mixed and kneaded sufficiently so that the paste enters the reticulate structure of the mannan gel. If the flakes of modified mannan gel are added in an amount less than 0.3 part by weight, the final product is not satisfactory although it may partially have a texture similar to that of real lobster meat. On the contrary, if the amount of the flakes added exceeds 2 parts by weight, the flakes are bound so loosely in the final product that when eaten they are easily separated in the mouth and cannot give an oral sensation similar to that experienced when real lobster meat is eaten.

The kneaded mixture of the fish meat paste and the flakes of modified mannan gel is then heated to obtain a final product. The heating may be conducted at a temperature required for thermal denaturation of the proteins of the fish meat and gelatinization of the starch. A shaped mass of the kneaded material having a thickness of about 3 cm may be steamed at $80°$ C. to $100°$ C. for 25 minutes to 45 minutes. The final product obtained in the above-mentioned manner comprises an integral mass of fish meat paste and thin flakes of modified mannan gel irregularly lying in many layers intermingled with the paste, so that the product has a texture as if there were two different kinds of muscular tissues having different degrees of resistance to mastication, and the texture gives an oral sensation similar to that experienced when real lobster meat is eaten.

The invention will be described further by way of the following examples.

EXAMPLE 1

30 g of mannan powder is put into 970 g of hot water at $40°$ C. and stirred for two hours, after which the mixture is held stationary for 16 hours to obtain a viscous water solution of mannan. 5 g of calcium hydroxide is dissolved in 50 ml of water, and the solution is added to the water solution of mannan. The mixture is stirred sufficiently and then put in a container of a conventional ice cutting machine, and the container is placed in a freezer and kept at $-20°$ C. for 16 hours so as to freeze and modify the mannan component of the mixture.

The frozen mass of modified mannan gel is then taken out of the container and sliced by the ice cutting machine into flakes 2 cm to 3 cm wide and 1 mm to 2 mm thick. The flakes are then put in a stream of water so that they are defrosted and at the same time the excess calcium is eluted from the flakes. The flakes are then put in a centrifuge for dehydration. The yield is 200 g of flakes of modified mannan gel.

The flakes thus obtained are divided into four equal parts each weighing 50 g, to which 25 g, 50 g, 75 g and 100 g of the above-mentioned fish meat paste are added.

After full kneading, each mixture is put in a plastic container to a thickness of 2 cm and steamed at 90° C. to 100° C. for 30 minutes to obtain a product of fish meat paste resembling real lobster meat.

EXAMPLE 2

50 g of mannan powder is put in 950 g of hot water and processed in the same manner as in EXAMPLE 1 so that a water solution containing 5% of mannan is obtained. Four samples each weighing 200 g are taken from the solution, and 6 g, 10 g, 14 g and 20 g of corn starch are added to the four samples, respectively. The samples are treated in substantially the same manner as in EXAMPLE 1 to obtain flakes of modified mannan gel, which look like lobster meat although they are a little less transparent than the flakes obtained in EXAMPLE 1.

50 g of the flakes obtained in the above-mentioned manner is added to 100 g, 95 g, 50 g and 25 g of fish meat paste, respectively. After kneading, each lot is put in a plastic container and steamed at 90° C. to 100° C. for 40 minutes to obtain a product resembling lobster meat.

Sensory tests have been conducted on the products obtained in EXAMPLES 1 and 2. The results of the tests indicate that the product containing 25 g of the fish meat paste has a texture very similar to that of spiny lobster meat and the product containing 75 g of the fish meat paste has a texture very similar to that of lobster meat.

With several persons who like lobster meat as panelists, further sensory tests have been conducted on the above-mentioned products containing 25 g and 75 g of the fish meat paste in comparison with natural lobster meat. It has been found out that the products of the invention and cooked natural lobster meat are so similar in taste and texture that when eaten on different days the products of the invention can hardly be distinguished from natural lobster meat.

What we claim is:

1. A process for preparing an edible product simulating the meat of lobster by:
   (a) preparing a fish meat paste by mixing "surimi" with at least one additive selected from salt, seasoning agents, starch and texturing agents;
   (b) preparing flakes of modified mannan gel by preparing a water solution of mannan, the amount of mannan being 0.5% to 20%, transforming said solution into gel form, modifying said gel form by freezing said gel form, making flakes from the frozen modified gel, said flakes being less than 3 mm in thickness and rinsing said flakes with water in order to defrost said flakes;
   (c) intimately mixing one (1) part by weight of said fish meat paste with 0.2 to 2 parts by weight of said flakes of modified mannan gel; and thereafter
   (d) coagulating the mixture of said fish meat paste and said flakes by applying heat thereto.

2. The process of claim 1, further including the step of shaping said mixture into pieces of predetermined shape and size before said coagulating step.

3. The process of claim 2, further including the step of coloring the surface of said pieces.

4. The process of claim 1, further including the step of shaping said coagulating mass into pieces of predetermined shape and size.

5. The process of claim 4, further including the step of coloring the surface of said pieces.

6. The process of claim 1, wherein said water solution of mannan further includes starch.

7. The process of claim 4, wherein the flakes of modified mannan gel are prepared by:
   preparing a water solution of mannan, the amount of mannan being 0.5% to 20%;
   pouring said solution onto a plate to form thereon a thin layer of mannan gel;
   applying a low-temperature gas to the surface of said layer for 2 to 5 minutes for preliminarily freezing the surface portion of said layer;
   placing said layer in a freezer for 30 minutes to 12 hours to freeze the mannan component of said layer;
   cutting said frozen layer into flakes 1.5 cm to 3 cm wide, 2 cm to 5 cm long and 0.5 mm to 1.5 mm thick; and
   rinsing said flakes with water in order to defrost said flakes.

8. The process of claim 7, wherein the mannan component of said layer is modified by freezing at a temperature from about −20° C. to −30° C. for 30 minutes to 12 hours.

9. The product of the process of claim 7.

10. The process of claim 1, wherein said gel form is modified by freezing at a temperature from about −20° C. to −30° C. for 3 to 16 hours.

11. The product of the process of claim 1.

* * * * *